Feb. 15, 1927.  1,617,749
D. ELDER
APPARATUS FOR WATERING AREAS OF LAND
Original Filed Jan. 5, 1922   2 Sheets-Sheet 1
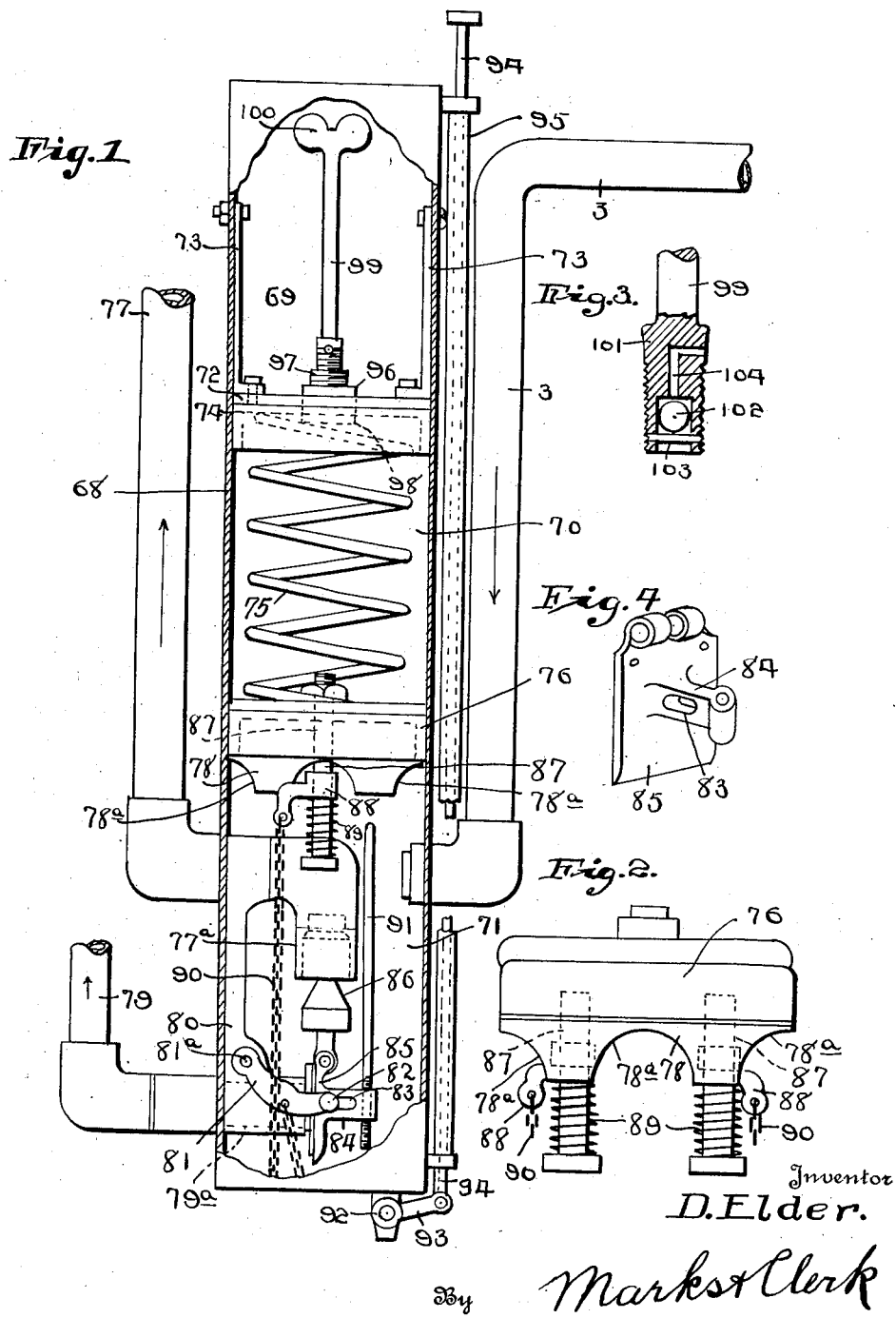

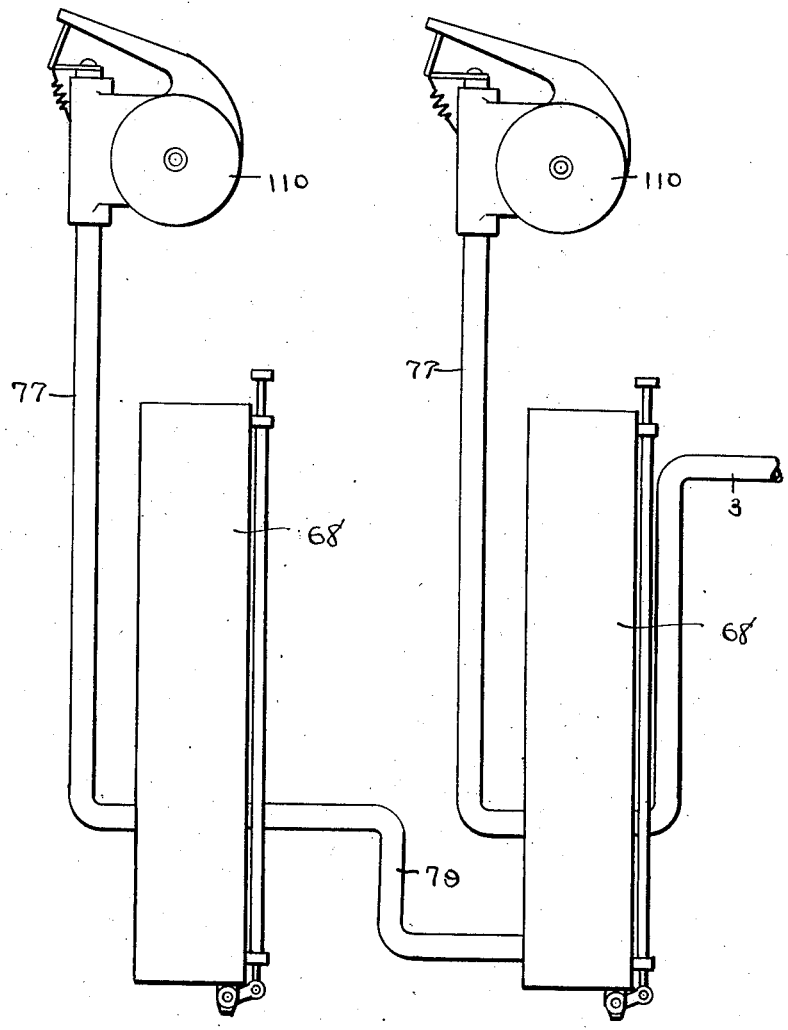

Patented Feb. 15, 1927.

1,617,749

UNITED STATES PATENT OFFICE.

DONALD ELDER, OF AUCKLAND, NEW ZEALAND.

APPARATUS FOR WATERING AREAS OF LAND.

Original application filed January 5, 1922, Serial No. 527,259, and in New Zealand September 7, 1921. Divided and this application filed July 24, 1922. Serial No. 577,266.

This invention relates to improvements in means employed in watering areas of land and is a division of my original application filed January 5, 1922, Serial No. 527,259.

The present improvement relates to improvements in that part of the apparatus which will be hereinafter referred to as a "regulator", the function of which is to control the length of the periods during which the water is permitted to flow to the sprayer so as to ensure that a given quantity of water will be distributed over the area at each operation of the regulator.

The regulator comprises a cylinder divided into three compartments, between the lowermost of which and the central or intermediate compartment a movable partition in the form of a plunger is provided. The central or intermediate compartment or the space between the plunger and the upper fixed division is filled with water, the length of time taken in the displacement of which or portion thereof, into the uppermost compartment through a regulatable valve in the upper division, by the pressure created in the lowermost compartment on the entrance of water thereinto from the repeater, equals the length of the period of each watering. The regulator is connected with the sprayer, and also when necessary with a further regulator. In the latter case, the cutting off of the water from the sprayer and the opening of the water passage to a succeeding regulator take place simultaneously on the plunger in the regulator rising a predetermined height.

Where a succeeding regulator is not employed, the cutting off of the water from the sprayer results in an excess of pressure in the pipe from the main cock, whereupon the repeater operates and causes the said main cock to be turned off.

The invention will now be more fully described in connection with the accompanying drawing in which:—

Figure 1 is an elevation, partly in section of the regulator.

Fig. 2 is an enlarged view of the regulator plunger.

Fig. 3 is an enlarged detail section of the valve located at the upper part of the regulator.

Fig. 4 is a perspective view of the valve at the lower end of the regulator removed, the latter valve being used to control the admission of water to additional regulators.

Fig. 5 is a diagrammatic view of an arrangement of several of the regulators operatively connected together and associated with sprayers.

Referring to the drawing in detail, 68 indicates a cylinder closed at the bottom and divided into three compartments 69, 70 and 71. The division between the uppermost compartment 69 and the central compartment 70 consists of a disk 72 secured in the lower ends of hangers 73 bolted inside of the cylinder. A packing member 74 secured to the under side of the disk 72 renders the division water-tight. A spiral spring 75 is also secured to the under side of the disk 72 and supports a plunger 76, which latter constitutes the division between the central compartment 70 and the lowermost compartment 71.

The water supply pipe 3 which is preferably connected with a "repeater" of the type disclosed in my co-pending application communicates with the compartment 71 which latter is also connected by a pipe 77 with a sprayer as indicated at 110 in Figure 5. The pipes 3 and 77 both project into the compartment 71, the latter pipe having a downwardly extended portion 77ª located centrally within the compartment 71. The plunger 76 is provided with a depending flange 78 having cutaway portions 78ª in order that said flange will rest or sit on the ends of the pipes 3 and 77 within the cylinder 68 when said plunger is as far down as it will go within the cylinder.

To enable the regulator to be connected with and to control a second regulator designated at 168 in Figure 5, a water outlet pipe 79 is connected with the lowermost compartment 71. This pipe 79 communicates with a passage 79ª provided in a fitting 80 preferably suspended from the pipe 97. A pin 81ª passing horizontally through the fitting 80 has an arm 81 keyed on each end and the arms are connected at their outer ends by a pin 82 passing through a horizontal slot 83 in a lug 84 projected from a valve 85 which latter is hinged at its upper edge to the stem of a cone-shaped valve 86 arranged in alinement with and adapted to enter the extremity 77ª of the pipe 77 for controlling the admission of water through the latter. A pair of vertical rods 87 are connected with the plunger 76 and slidably support arms 88 which latter are normally maintained in elevated position by the tension of springs 89. The arms 88 are connected by chains 90 with the arms 81 and a vertical rod 91 screwed into the lug 84 of the valve 85 is adapted to be engaged by the plunger 76 during downward movement of the latter whereby to automatically close the valve 85.

A drain cock 92 at the bottom of the cylinder 68 is provided with an arm 93 connected with a rod 94 which is movable vertically in a tube or guide 95. The arrangement of the cock and rod is such that upon moving the latter upwardly the valve is opened, whereas upon depressing the rod the valve is closed.

The disk 72 is provided with a central boss 96 in which is threaded a nipple 97 provided with a nut 98 by which the spring 95 and packing member 74 are secured to the disk 72. A rod 99 provided with a thumb piece 100 at its upper end and formed with an enlarged slightly tapered lower end 101, Fig. 3 made hollow to receive a ball 102 is threaded externally to fit in the nipple 97, a cross pin 103 being inserted in the enlarged end 101 to retain the ball in position. The enlarged extremity of the rod is provided with a port 104 communicating with a chamber containing the ball 102.

The water flows from the pipe 3 into the compartment 71 and passes into the pipe 77 through the lower open end of the depending portion 77ª. For the sake of clearness, the plunger 76 has been shown somewhat elevated, whereas, normally it rests on the inner ends of the pipes 3 and 37. The outflow of water from the pipe 77 is restricted by the latter being connected with a sprayer 110 and hence all the water entering the compartment 71 cannot escape by way of the pipe 77. It is here necessary to mention that the compartment 70 between the disk 72 and the plunger 76 is filled with water.

The flow of water being restricted by the nozzle or sprayer 110, accumulates in the compartment 71 and the pressure thereof forces the plunger 76 upwardly against the action of the spring 75 and the water held in the compartment 70. The water in the compartment 70 is forced upwardly and presses the ball 102 against its seat, thus cutting off the flow of water through the passage 104 and compelling the water to escape into the uppermost compartment 69 by passing around the screw threads between the tapered end 101 of the rod 99 and the nipple 97. If it is desired that the water in the compartment 70 shall pass quickly into the compartment 79 then the end 101 is not screwed tightly into the nipple 107, but if, on the other hand it is desired that the escape of water from the compartment 70 to the compartment 69 shall be slow, then the member 110 is advanced further into the nipple 97.

The plunger 76 rises against the combined tension of the spring 75 and the retarding effect of the slowly escaping body of water in the compartment 70 and when said plunger reaches a predetermined position in the compartment 70, the chains 90 are drawn out to their full length thereby lifting the arms 81 together with the valve 85 and rod 91. The valve 86 actuated by the valve 85 approaches the open end of the pipe at 77ª and being caught in the stream of water entering said pipe, is seated with a sudden movement thereby completely cutting off the flow of water to the pipe 77 and simultaneously opening the valve 85 so as to permit the water which continues to flow into the chamber 71 to enter and flow through the pipe 79.

As suggested in Figure 5, the pipe 79 may be connected with a second regulator 168 and, in fact, the number of regulators may be increased in accordance with the number of sprayers necessary for the watering of the area of land undergoing treatment. In the present instance, however, only two regulators have been illustrated, 68 and 168 and these are indentical in construction with the exception that the second regulator in the series is not equipped with a second outlet pipe 79 and the controlling valve 85 therefor. In this instance the arms 81 are connected directely with the stem of the valve 86 and upon the plunger 76 reaching a predetermined position in the cylinder of the regulator, the chain 90 is drawn taut, effecting the elevation of the arms 81 and the consequent closing of the valve 86. When the flow of water to the outlet pipe 77 of the last regulator 168 is cut off the sprayer 110 associated therewith ceases to operate and the increase in the pressure which occurs as a consequence of the cutting off of the water is preferably utilized for the operation of a repeater such as disclosed in my copending application. By the utilization of a repeater of this type, a drain cock (not shown) connected in the pipe line 3 is automatically opened simultaneously with the closure of the valve 86 in the last regulator 168 and hence the water standing in the pipe line 3 and in the chamber 71 may freely drain therefrom permitting the plunger 76 to return to its normal position under the influence of the spring 75.

During downward movement of each plunger 76, the water which has passed from the intermediate compartment 70 up into the top compartment 69 returns by gravity to the intermediate compartment 70 through the passage 104 in the enlarged lower end of the rod 99, the ball valve 102 opening by gravity to permit such return of the water to the compartment 70. The length of time during which the water shall issue from a sprayer 110 is governed by the regulator associated therewith and the time interval may be varied as desired by varying the rate of escape of water from the compartment 70 to the compartment 69, such regulation being effected, as will be understood, by proper adjustment of the enlarged lower extremity 101 of the adjustable rod 99. It will be further understood that the time interval of the activity of the sprayer 110 is dependent upon the tension of the spring 75.

Thus it will be seen that the issue of the water from the sprayer may be made to extend over long or short periods as desired, by adjusting the enlarged end 101 of the rod 99 in the nipple 97, to permit the water to pass slowly or quickly from the compartment 70 to the compartment 69 as required. By regulating the length of time the sprayer shall operate a given quantity of water may be sprayed over the land.

The presence of the spring 75 in the regulator renders the same positive in its operation, as when the water is cut off by the cock of the repeater or other control device, said spring insures the return or downward movement of the plunger 76 whereby the valve 86 opens the lower end of the portion 77$^a$ and the valve 85 closes the entrance to the passage 79$^a$ owing to the plunger 76 striking and moving the rod 91 downwardly, the regulator being again ready for use when the water pressure in the pipe 3 is restored.

What I claim is:—

1. In an apparatus of the character described, a cylinder, a movable partition arranged in the cylinder, said cylinder having a water inlet and a plurality of water outlets therein, a valve for controlling the passage of water through one of the outlets actuated in response to continued application of water pressure to the movable partition to open said outlet, and means acting in response to a reduction of pressure on the movable partition to close said outlet, said last mentioned means including a rod engageable by the movable partition and adjustably threaded directly in said valve.

2. In an apparatus of the character described, a cylinder, a fixed and a movable partition in said cylinder dividing the interior of the latter into three compartments, a water inlet for the compartment below the movable partition, water outlets connected with the last mentioned compartment adapted for connection, respectively, with a sprayer and with a second cylinder, tensioning means between the fixed division and the movable division, means associated with said movable division for effecting the automatic closing of the water outlet to the sprayer, and means normally closing the outlet to the second cylinder and operated simultaneously with the closing of the closing means for automatically opening the water outlet to the second cylinder.

3. In an apparatus of the character described, a cylinder, a fixed division and a movable division arranged in said cylinder dividing the interior of the latter into three compartments, a compression spring suspending the movable division in the cylinder, means for regulating the passage of water from the intermediate compartment to the compartment above the fixed division, an inlet for the compartment below the movable division, outlets for the last mentioned compartment adapted for connection, respectively, to a sprayer, and a second cylinder, connected valves operated by the upward movement of the movable division for closing the outlet to the sprayer simultaneously with the opening of the outlet to the second cylinder, and means to cause said valves to return to initial position.

4. An apparatus as claimed in claim 1 characterized by the provision of a valve controlling the discharge of water through another of the outlets, means pivotally connecting the second valve to the first valve, and means pivotally supporting the second valve in operative relation to the water outlet associated therewith.

5. An apparatus as claimed in claim 1 characterized by the provision of a cone-shaped valve adapted for insertion in one of the water outlets to control the passage of water therethrough, a second valve hinged to the first valve and normally closing the entrance to another of the water outlets, a support connected with one of the water outlets, and arms connected with said support and pivotally supporting the second mentioned valve.

6. An apparatus as claimed in claim 1 characterized by the provision of rods depending from the movable division, arms slidable on said rods, tensioning means normally retaining the arms in elevated position, valves associated with the water outlets, and flexible means connecting said arms with said valves for actuating the latter.

7. An apparatus of the character described including a cylinder having a plurality of outlet valves associated with the outlets, means connecting said valves whereby one valve is maintained in open position while the other is closed, a movable member mounted in said cylinder, and means resiliently connecting the valve with the movable member whereby, incident to movement of the latter in one direction, said valves are actuated.

In testimony whereof I hereunto affix my signature.

DONALD ELDER.